Oct. 27, 1936.  E. A. SEYMOUR  2,059,045
VALVE STRUCTURE
Filed June 10, 1935
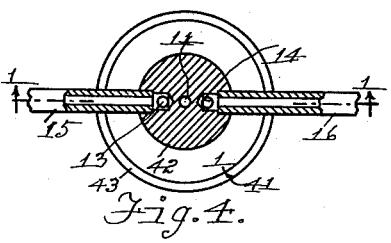
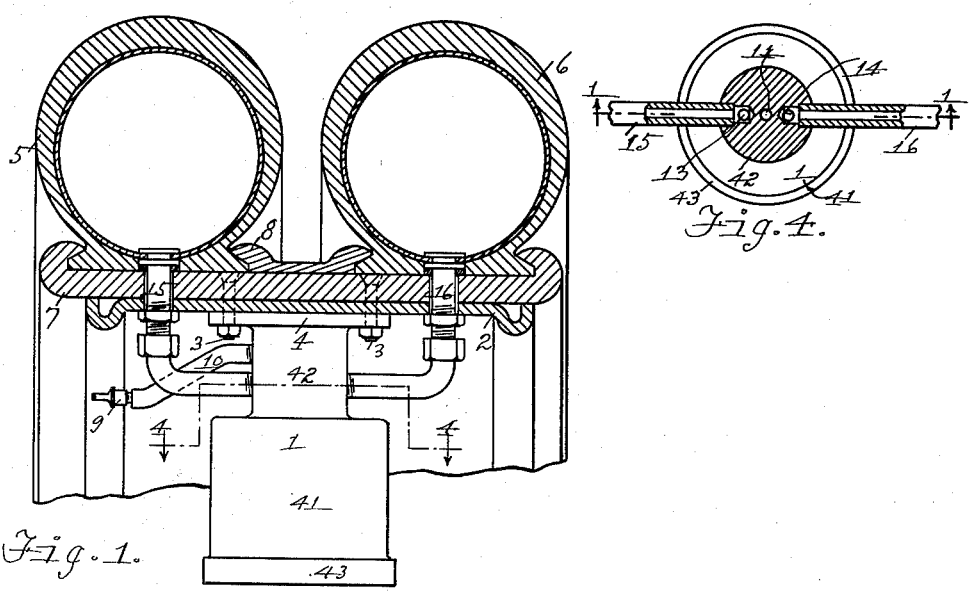
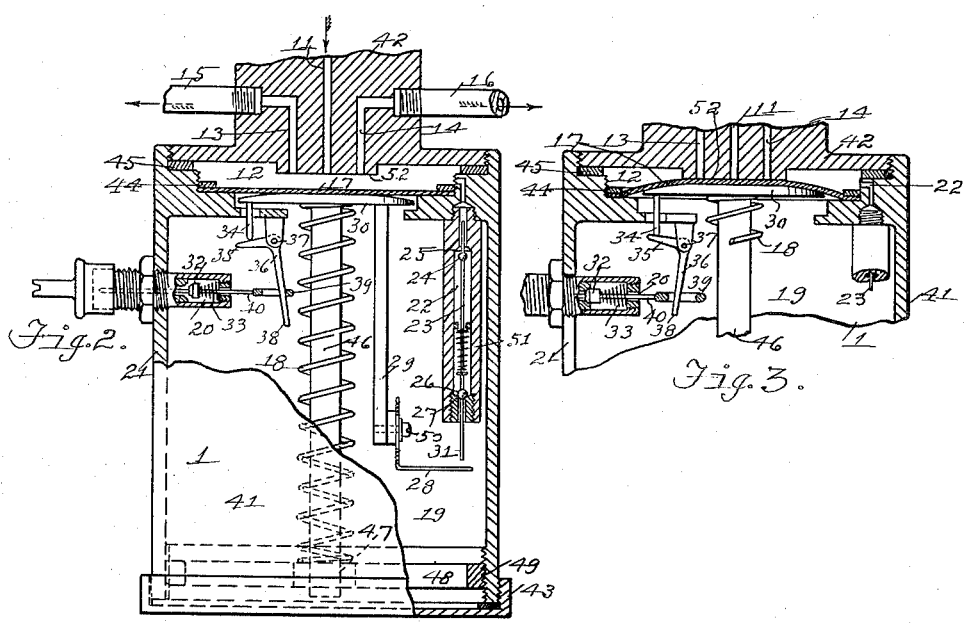
INVENTOR.
Edward A. Seymour
BY Rice and Rice
ATTORNEYS.

Patented Oct. 27, 1936

2,059,045

UNITED STATES PATENT OFFICE 2,059,045

VALVE STRUCTURE

Edward A. Seymour, Grand Rapids, Mich.

Application June 10, 1935, Serial No. 25,803

4 Claims. (Cl. 152—12)

The present invention relates to valve structures, particularly such as are employed to control fluid pressure in the pneumatic dual tires of automobiles and the like; and its object is, generally, to provide a structure of this character improved in respects hereinafter appearing; and more particularly, to provide in such a structure means for utilizing fluid pressure in the tires for securely seating a valve which controls such pressure therein; and further, to provide in such a structure a pair of chambers separated by such a main valve and having a bypass provided with a secondary valve operable by the seating movement of the main valve; and further, to provide in such a structure an improved diaphragm valve for controlling fluid pressure.

These and any other and more specific objects hereinafter appearing are attained by and the invention finds preferable embodiment in the illustrative valve structure particularly described in the body of this specification and illustrated by the accompanying drawing, in which:

Figure 1 is a view of a portion of the circumferential part of an automobile wheel on which dual pneumatic tires are mounted, showing my valve structure applied thereto, certain parts being sectioned on a radial plane corresponding to line 1—1 of Figure 4;

Figure 2 is a longitudinal central sectional view (enlarged) of the valve structure taken on said plane and showing the parts in the normal operation of the automobile;

Figure 3 is a like view of a portion thereof, but showing the parts in another position;

Figure 4 is a transverse sectional view of portions of the same taken on line 4—4 of Figure 1.

In the drawing is illustrated my valve structure designated generally 1 applied to the felloe or rim 2 of an automobile wheel as by threaded bolts 3 extending through the flange 4 of said structure. Pneumatic dual tires 5, 6 are mounted side by side on this felloe as by clincher devices 7, 8 and are inflated by a pump applied to the valve 9 of ordinary form, and forcing air through the tube 10 and the communicating passage 11 of said structure into its valve chamber 12 and thence through the structure's passages 13, 14 and their communicating tubes 15, 16, into the tires 5, 6 respectively. The pressure thus created in the chamber 12 moves the diaphragm valve 17 from seating position to its open position shown in Figure 2, against the pressure of the coiled spring 18, so that uniform air pressure between the two tires and through said chamber is maintained during the normal operation of the automobile. Air in the structure's chamber 19, on the opposite side of the diaphragm valve from the chamber 12, is during said normal operation maintained at approximately atmospheric pressure by means of the opening 20 through the wall 21 of chamber 19.

In case one of the tires, say tire 5, suffers a puncture or a "blow out", the air passing outwardly therefrom immediately lessens the air pressure in chamber 12, so that the spring 18 may expand and move the diaphragm valve toward its closed position shown in Figure 3, wherein it is pressed by said spring on the wall 52 of chamber 12 to cover the passage 13 leading from the injured tire 5 (and also the passages 11, 14) and thus seal the chamber 12 so that the automobile may continue traveling on the uninjured tire 6.

In case of a "blow out" or other comparatively great injury to a tire (as the tire 5), the pressure in chamber 12 decreases so rapidly that the spring 18 closes the diaphragm valve suddenly; but if such injury is comparatively slight thus causing a "slow leak" in tire 5, the pressure in chamber 12 diminishes slowly, during which time the air passes out of the chamber 12 correspondingly slowly. In order to close the diaphragm valve more rapidly and hold it closed more completely, I provide a bypass 22 between the chambers 12 and 19 and the following operating mechanism. This bypass is valved, having a valve stem 23 carrying in spaced relation the valve 24 seating on the seat 25 and the valve 26 which is normally pressed on its seat 27 by pressure in chamber 12; but when one of the tires (as tire 5) suffers an injury or develops a leak reducing the pressure in chamber 12 to such an extent that the spring 18 expands sufficiently the laterally extending arm 28, of the rod 29 carried by the head 30 which contacts the inner side of the diaphragm valve, engages the inner end 31 of valve stem 23 and moves it far enough to unseat valve 26, so that the pressure in chamber 12 is communicated to chamber 19, thus tending to balance the pressure in these two chambers and assisting the spring 18 in closing the diaphragm valve 17 to maintain air pressure in the uninjured tire 6.

When valve 26 is thus unseated to admit pressure into chamber 19, the opening 20 through the wall of this chamber is closed to confine pressure therein, by the following means:

Said opening has a normally open valve 32 urged to seating position by a spring 33. In the normal operation of the automobile this valve is held open, to create atmospheric pressure in chamber 19, by the pin 34 extending inwardly from said head 30, said pin engaging the arm 35 of a bell crank lever 36 fulcrumed at 37 and holding said lever in the position shown in Figure 2 wherein its arm 38 engages at 39 the stem 40 of valve 32 and holds it open; but when the diaphragm valve moves toward closed position and on opening valve 26 as above described, the pin 34 releases said lever so that valve 32 closes as shown in Figure 3 to confine pressure in chamber 19 for assisting spring 18 in seating the diaphragm valve.

The valve structure includes a casing comprising a hollow cylindrical part 41 with the head 42 (having the flange 4) threaded thereinto, and the cap 43 threaded on its opposite end. A ring 44 threaded into said body clamps the diaphragm valve 17 in place and a packing ring 45 is clamped in place by the head 42. The diaphragm valve is supported in its middle and moved to seating position by the flat-dome shaped head 30 having the central shank 46 slidable in a bearing 47 in the center of a spider 48 threaded at 49 in the interior of said body and turnable to adjust the tension of the spring 18 which presses between it and the head 30. The arm 28 is desirably springable and is held in adjusted position on the rod 29 by a set screw 50. A weak spring 51 urges the valve 26 to seated position.

When the diaphragm valve seats the spring arm 28 yieldingly seats the valve 24, so that the chamber 19 retains the pressure therein.

The invention being intended to be pointed out in the claims, is not to be limited to or by details of construction and arrangement of the particular embodiment thereof illustrated by the drawing or hereinbefore described.

I claim:

1. In a valve structure for controlling fluid pressure in dual pneumatic tires: a body having a pair of chambers, one of the chambers having an inlet for fluid under pressure and fluid passages communicating with the tires respectively; a diaphragm separating the chambers spring pressed to a position closing the inlet and the passages and movable oppositely by fluid pressure in said chamber; a fluid bypass connecting the chambers; a normally closed valve in the bypass; means in the other chamber mechanically operable in connection with the movement of the diaphragm towards its said position for opening the valve.

2. In a valve structure: a body having a pair of chambers, one of the chambers having separate fluid passages; a movable partition wall separating the chambers spring pressed in one direction to a position closing said passages and movable in the opposite direction by fluid pressure in said chamber; a fluid bypass connecting the chambers; a normally closed valve in the bypass; mechanical means operable by the movement of the wall in the first-mentioned direction for positively opening the bypass valve.

3. In a valve structure having a pair of chambers, one of the chambers having an inlet for fluid under pressure and an outlet therefor, the other chamber having an opening to atmosphere: a diaphragm located between the chambers spring pressed to position closing said inlet and outlet; a fluid bypass connecting the chambers; a normally closed valve for the bypass; means operable in connection with the movement of the diaphragm toward its said position for opening the bypass valve; a valve in said opening to atmosphere spring pressed to closed position; means operable in connection with the movement of the diaphragm from its said position for opening the last-mentioned valve.

4. In a valve structure having a pair of chambers, one of the chambers having an inlet for fluid under pressure and an outlet therefor, the other chamber having an opening to atmosphere: a diaphragm located between the chambers spring pressed to position closing said inlet and outlet; a fluid bypass connecting the chambers; a normally closed valve for the bypass; an arm movable with the diaphragm extending in the second-mentioned chamber and adapted to engage the bypass valve and move the same to open position by the movement of the diaphragm toward closing position; a valve in said opening to atmosphere spring pressed to closed position; mechanical means in the second-mentioned chamber for opening the last-mentioned valve by the movement of the diaphragm from closed position.

EDWARD A. SEYMOUR.